US011857872B2

(12) United States Patent
Vukojevic et al.

(10) Patent No.: US 11,857,872 B2
(45) Date of Patent: Jan. 2, 2024

(54) CONTENT ADAPTIVE DATA CENTER ROUTING AND FORWARDING IN CLOUD COMPUTING ENVIRONMENTS

(71) Applicant: NVIDIA Corporation, Santa Clara, CA (US)

(72) Inventors: Bojan Vukojevic, Pleasanton, CA (US); Jason Baurick, Fort Collins, CO (US); Khurrum Islam, San Jose, CA (US); Yury Taradzei, Sunnyvale, CA (US); Siddheshwar Mahesh, San Jose, CA (US); Rachid Ennaji, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 149 days.

(21) Appl. No.: 16/935,091

(22) Filed: Jul. 21, 2020

(65) Prior Publication Data

US 2022/0023755 A1 Jan. 27, 2022

(51) Int. Cl.
*A63F 13/358* (2014.01)
*A63F 13/352* (2014.01)
(Continued)

(52) U.S. Cl.
CPC .......... *A63F 13/358* (2014.09); *A63F 13/352* (2014.09); *H04L 47/18* (2013.01); *H04L 47/2433* (2013.01); *H04L 67/14* (2013.01)

(58) Field of Classification Search
CPC ...... A63F 13/358; A63F 13/352; H04L 47/18; H04L 47/2433; H04L 67/14; H04W 28/02
See application file for complete search history.

(56) References Cited

U.S. PATENT DOCUMENTS

2014/0258374 A1* 9/2014 Suryanarayanan ........................
H04L 67/1021
709/203
2016/0256784 A1* 9/2016 Schultz ................... A63F 13/48
(Continued)

OTHER PUBLICATIONS

International Search Report and Written Opinion received for PCT Patent Application No. PCT/US2021/040655, dated Oct. 15, 2021, 13 pages.

(Continued)

*Primary Examiner* — Yingchuan Zhang
(74) *Attorney, Agent, or Firm* — Taylor English Duma L.L.P.

(57) ABSTRACT

High performance applications—such as cloud game streaming, cloud virtual reality (VR), remote desktop, and others—are sensitive to various network conditions, such as latency, jitter, and packet loss. Systems of the present disclosure may match network characteristics for a user device with latency requirements for a particular application type, and application sessions may be forwarded or distributed to a suitable data center. To accomplish this, application specific network tests may be executed to determine requirements for executing a high performing application session for a user. The result of these tests, in addition to application specific performance requirements, may be used to find a suitable data center—from a set of available data centers—that is capable of hosting the application session without degradation. As a result, efficient use of distributed infrastructures may be accomplished, while avoiding congestion and hot-spots, and providing an optimized application experience for end users.

20 Claims, 9 Drawing Sheets

(51) Int. Cl.
*H04L 47/10* (2022.01)
*H04L 47/2425* (2022.01)
*H04L 67/14* (2022.01)

(56) References Cited

U.S. PATENT DOCUMENTS

2016/0277315 A1* 9/2016 Miller .................. G06F 16/9537
2019/0321725 A1* 10/2019 Zimring ................ A63F 13/355
2021/0014725 A1* 1/2021 Sridhar ............. H04W 28/0284

OTHER PUBLICATIONS

Vukojevic, Bojan; International Preliminary Report on Patentability for PCT Application No. PCT/US2021/040655, filed Jul. 7, 2021, dated Feb. 2, 2023, 11 pgs.

* cited by examiner

CONTENT ADAPTIVE DATA CENTER ROUTING AND FORWARDING IN CLOUD COMPUTING ENVIRONMENTS

BACKGROUND

High performance network streaming applications—such as cloud gaming, cloud virtual reality (VR), remote workstation, and/or other application types—are typically sensitive to network performance parameters like latency, jitter, bandwidth, and packet loss. Impacts on performance may be realized due to a combination of network performance parameters of a local network experienced by a user device, of Internet connections between a user device and a data center (e.g., due to a distance between the user device and the data center, due to internet service provider (ISP) network infrastructure used by the data center, etc.), and/or hardware or other resource and performance requirements of a particular application. For example, for data centers that are located far from the user device (e.g., 500 or more miles), the latency experienced by the application from communicating data over such far distances may be increased to a level that is unsuitable for the application to execute correctly or acceptably. As a result, such as in a cloud-based game streaming application, the latency (and/or jitter, packet loss, bandwidth, etc.) may cause the game to be unplayable as the effects produced from inputs to the game may be reflected on the display too long after the input is received.

Traditional deployments of infrastructure—e.g., data centers—to support workloads of high performance applications have not been sufficient to support optimal user experiences. Internet protocol (IP) geolocation (GeoIP) may be used to route a user device to an assigned data center—where the assignment is agnostic to the hardware, network, and resource requirements for the specific application being executed. For example, in the United States, an application host provider may only have an East Coast and a West Coast data center. As a result, users in the Central United States may be routed to one of these data centers—which may be upwards of 1500 miles from the user's home network—causing performance degradation for the application. In addition, even where a user on the West Coast is routed to the West Coast data center, the hardware resources, capacity, and/or network performance may not be suitable for the particular application. Further, where IP addresses are reassigned using GeoIP, this information may not be distributed back to the user device. As a result, where an IP address is reassigned from the West Coast to the East Coast data center, for example, user devices located on the West Coast and assigned to the IP address may now be required to communicate with a data center across the country when executing the corresponding application. This may cause performance issues that render the application unusable.

Some conventional systems rely on content delivery networks (CDNs)—e.g., widely distributed edge servers—to support applications. However, current CDNs lack the computational resources for on-demand, high performance applications—such as cloud gaming, remote desktop, cloud VR, etc.—due to their implementation for less demanding applications (e.g., web-content, video streaming, etc.). In addition, assignment of an application to a particular edge server of a CDN does not take into account the hardware or network performance requirements of the application. As a result, where a CDN is used for an on-demand application, frequent buffering may be experienced due to latency, and application quality may be diminished as the servers of the CDN may not include sufficient hardware, network performance, or other resources capable of effectively hosting the on-demand application.

SUMMARY

Embodiments of the present disclosure relate to data center distribution and forwarding for cloud computing applications. Systems and methods are disclosed that execute application specific network tests—for the user's network and/or the network(s) connecting a user device to a data center, or a region of data centers—to determine an application profile for the user and a suitable data center(s) to host an application session according to the application profile. For example, where data centers are distributed more widely (e.g., one or more per metropolitan region), measurement of network characteristics from the perspective of the user towards the different data centers—or data center regions—may be executed. The network tests may be customized to a specific application type such that the results of the test are informative as to the performance of the particular application for the individual user. As a result, with a heavily distributed infrastructure, it is possible that a plurality of data centers will have acceptable network and/or hardware performance for hosting the application. A user device may submit a determined application profile to a data center, which may include information about other suitable data centers, and a scheduler executing on the data center may determine a suitable host for the application session. For example, the scheduler may determine hardware and/or network performance requirements for the particular application—e.g., a particular game in a cloud gaming environment—and may either determine to host or to forward hosting requests on to the other suitable data centers. Ultimately, an application profile of the user device and network, the specific application requirements, the host hardware configuration requirements, and/or other criteria may be accounted for when determining a suitable host data center—or server thereof—for executing a session of an application.

In addition, congestion control and resource utilization may be considered by a selected data center when determining distribution or forwarding of application sessions. For example, historical data may be used to forecast when certain data centers will be congested, or at capacity, and host requests may be forwarded to less congested data centers. As another example, where a first application (e.g., a game not as affected by higher latency) does not require the compute resources of a particular data center, but a second application (e.g., a latency sensitive application) often does, the host request may be forwarded to another data center with less compute resources (e.g., with older model hardware) to decrease congestion and maximize resource usage, without degrading the performance of the first and second applications. In some embodiments, where a multihomed data center is selected, application quality of service (QoS) metrics for different ISPs of the data center may be analyzed to determine the most suitable ISP for the particular end user device—and/or the particular application executed thereby.

BRIEF DESCRIPTION OF THE DRAWINGS

The present systems and methods for data center distribution and forwarding for cloud computing applications are described in detail below with reference to the attached drawing figures, wherein.

DETAILED DESCRIPTION

Figure 1:
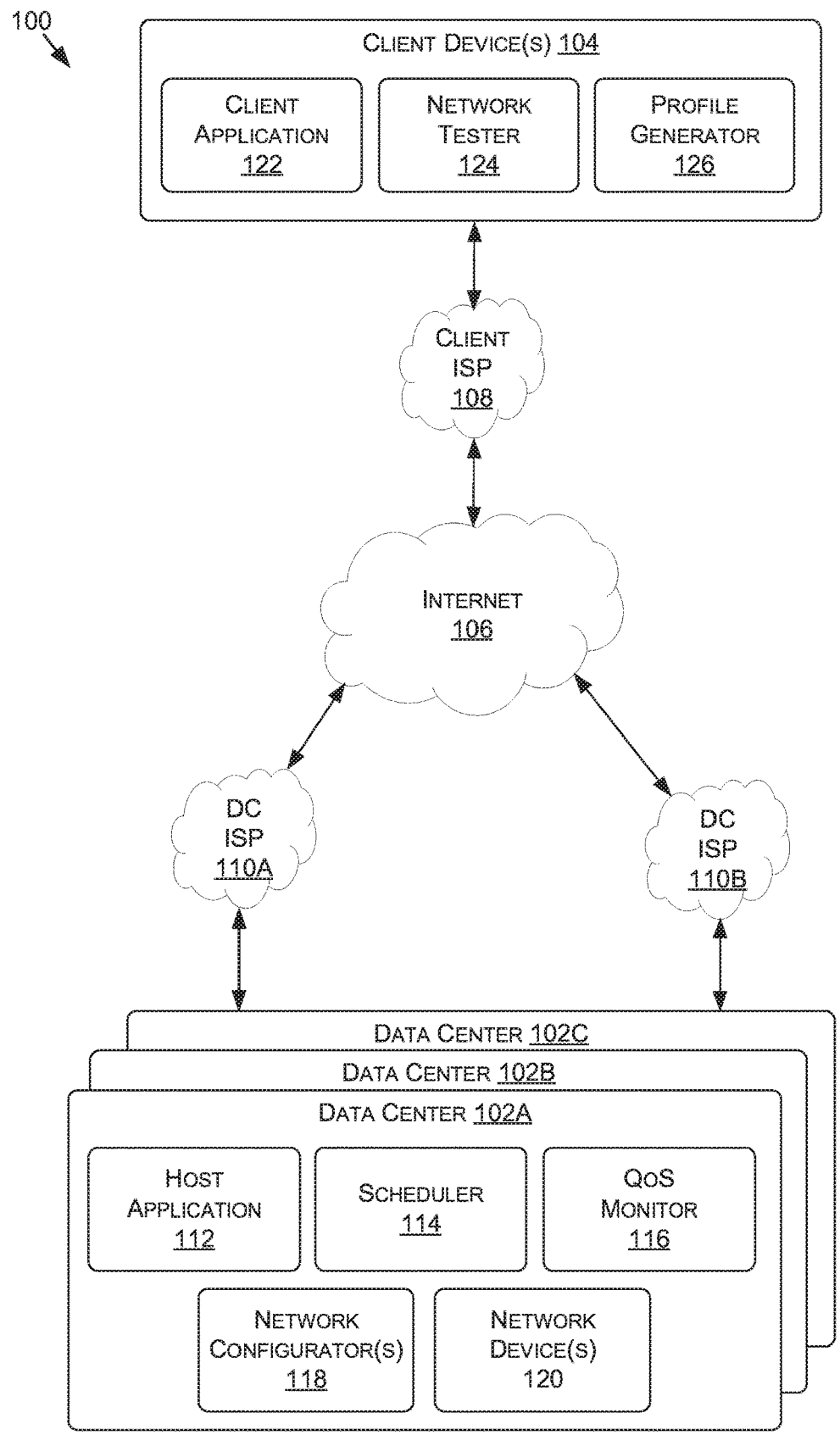
FIG. 1 is a block diagram illustrating an application session distribution and forwarding system, in accordance with some embodiments of the present disclosure.

Systems and methods are disclosed related to data center distribution and forwarding for cloud computing applications. The systems and methods described herein may be implemented for increasing application performance for any application type, such as, without limitation, streaming, cloud gaming, cloud virtual reality (VR), remote workstation applications, and/or other application types. For example, applications may be sensitive to various network performance parameters such as latency, packet loss, bandwidth, and/or jitter and/or application performance parameters such as session yield and/or application quality of service (QoS) metrics. As such, the system and methods described herein may be implemented in any system to increase the network and application performance for any type of application executing over a network(s)—such as the Internet. In addition, although the border gateway protocol (BGP) is primarily described herein as the protocol to which routing updates or policies are directed to, this is not intended to be limiting, and any suitable protocol may be used—e.g., the routing information protocol (RIP), secure BGP (sBGP), secure origin BGP (soBGP), etc.

Infrastructure for high performance applications—such as game streaming, cloud-based VR, etc.—is often distributed among a higher number of data centers such that at least one data center is closer to a user population. By distributing the data centers in this way, the amount of resources in any single data center may be limited and, to effectively accommodate all users, the system of the present disclosure optimizes the distribution and allocation of these resources. For example, network characteristics from the perspective of a user device towards data centers may be measured for the particular application. This measurement may include latency, jitter, packet loss, bandwidth, and/or other network measurements. The measurement may be performed as an application-specific or custom network test that simulates network traffic for the particular application between and among one or more data centers and the user device. As an example, in a cloud game streaming environment, the simulated traffic may be bursty (characterized by brief periods of intermittent, high volume data transmission interspersed among periods with little to no data exchanged), and a traditional bandwidth test may return inaccurate results as to the ability of the user's network to handle the bandwidth requirements of a game streaming application. As such, a customized network test may be performed to determine the ability of the user's network and/or device to handle the network traffic of a game stream for a particular game.

In addition, with a heavily distributed infrastructure, it is likely that more than one data center will have acceptable network characteristics—e.g., latency—so the user device may obtain information (e.g., via an application programming interface (API)) about each of the available data centers. Once the available data centers are determined, a preliminary network test may be performed for determining a subset of the data centers—or regions of data centers—that have acceptable preliminary network characteristics (e.g., latency characteristics). A single region, or data center thereof, may then be selected and the more detailed and customized network test, described herein, may be performed using the selected data center. This test may be used to generate a streaming profile for the user device and the network of the user (e.g., a local network)—e.g., including bandwidth capabilities, image quality or resolution information, bit rate information, audio quality of resolution information, device type (e.g., smartphone, tablet, high-performance computer, etc.). The streaming profile may be generated and/or updated a first time an application is executed on the user device, when changes to network characteristics are identified (e.g., new data centers come on line, a device type changes, a new user network is detected, etc.), periodically, at an interval, etc.

Once a streaming profile is generated for a user device, when an application session is started on the user device, a preliminary network test (e.g., a latency test) may be executed. As a result, one or more data centers may be returned that have suitable latency, and a request for hosting the application session may be sent to a suitable data center (e.g., the data center with the lowest latency). A scheduler of the data center may receive this request—including data representing the streaming profile, data representing other suitable data centers determined from the preliminary network test, etc.—and may determine if the data center is able to host the application session (e.g., a game instance of a cloud gaming application). For example, the streaming profile may indicate the quality of the application stream(s) that are supported and requested by the user device (e.g., 4K, 8K, etc.) and the network characteristics (e.g., latency, jitter, packet loss, bandwidth, or other characteristics). In addition, requirements related to the particular application (e.g., a particular game type) may be analyzed to determine if the data center can host the game at the quality of service (QoS) level desired. As such, with these criteria in mind, the scheduler may determine that the data center can or cannot host the game.

Where the data center cannot host the game—e.g., due to an incorrect hardware configuration, due to network issues, due to congestion, due to expected congestion, to maximize resources, etc.—the scheduler may forward the request to one or more other suitable data centers (e.g., all at the same time, one at a time, etc.). The forwarded request may include information from the original request of the user device, in addition to supplemental information such as the hardware requirements, the performance requirements of the particular application (e.g., the particular game), etc. The requests may be forwarded until another data center indicates acceptance of the request. Once accepted, the scheduler of the original data center may send a response to the user device indicating (e.g., via an IP address) the data center that will host the application session. The application session may then begin with the assigned data center hosting the application session for the user device.

For the selected data center, additional criteria may be taken into account, in embodiments. For example, the data center may be a multihomed data center with two or more ISPs providing Internet access. The data center may then analyze application-specific (and/or instance-specific) QoS metrics of the application session across two or more of the ISPs, and determine the ISP that provides the best QoS. If the best performing ISP is different from the current ISP (or any other ISP has a higher QoS above a threshold difference), the data center may update import route maps and/or export route maps for a network device(s)(e.g., a core switch(es)) of the data center to control routing of the network traffic through the desired ISP. For example, some user ISPs may not work well with ISPs of the data center, and the ISP switching methods described herein may account for these issues to increase end-to-end network performance.

By matching network characteristics for a user device with latency requirements for a particular application type (e.g., a particular game), application sessions may be forwarded or distributed to different data centers without degrading performance. In addition, due to forwarding without degradation, congestion control may be implemented to switch away from data centers forecasted to have more usage (e.g., based on historical data), or to switch away to data centers that may be further away—and have higher latency—but that still match latency requirements for a particular application. As a result, data centers may be reserved for users who are more closely located and/or executing more latency sensitive applications. The systems and methods described herein may provide effective and efficient use of distributed infrastructures, and avoid congestion and hot-spots, while providing an optimized application experience for end users.

With reference to FIG. 1, FIG. 1 is an example application session distribution and forwarding system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, components, features, and/or functionality of the system 100 may be similar to that of example game streaming system 500 and/or example computing device 600.

The system 100 may include one or more data centers 102 (e.g., data centers 102A, 102B, and 102C) and/or one or more client devices 104 that communicate over the Internet 106 via one or more internet service providers (ISPs), such as data center (DC) ISPs 110A and 110B, and/or client ISP(s) 108. In some embodiments, the system 100 may correspond to a cloud computing and/or a distributed computing environment. For example, where the host application 112 corresponds to a cloud gaming application, the example game streaming system 500 of FIG. 5 may include one suitable architecture or platform for supporting the cloud gaming application.

The DC ISPs 110 may provide access to the Internet 106 (and/or other WAN) for the data centers 102 and the client ISP(s) 108 may provide access to the internet for the client device(s) 104. In some embodiments, one or more of the DC ISP 110 and/or the client ISP 108 may be a same ISP, while in other embodiments, one or more of the DC ISPs 110 and 108 may differ. In addition, where more than one data center 102 is implemented, different data centers 102 may use different DC ISPs 110 and/or where more than one client device(s) 104 is implemented, different client devices 104 may use different client ISPs 108.

Although referred to as the Internet 106, this is not intended to be limiting, and the system 100 may be implemented for any network types, such as wide area networks (WANs), local area networks (LANs), cellular networks, other network types, or a combination thereof. Although the data centers 102 are illustrated as being multihomed—e.g., having two DC ISPs 110A and 110B—this is not intended to be limiting and, in some embodiments, one or more of the data centers 102 may not be multihomed. In addition, although illustrated as including only one client ISP 108, this is not intended to be limiting, and the client device(s) 104 may include more than one client ISP 108. In addition, although only a single link through each ISP is illustrated, this is not intended to be limiting, and in some embodiments an individual ISP—such as the DC ISP 110A—may include a plurality of separate routes or edge router access points or nodes for the data centers 102. For example, in some embodiments, when switching from one ISP to another, this may correspond to switching from a first route (e.g., via a first edge router of the ISP) through an ISP to a second route (e.g., via a second edge router of the ISP) through the same ISP.

The data centers 102 may host a host application 112—e.g., a high performance application, a cloud game streaming application, a virtual reality (VR) content streaming application, a content streaming application, a remote desktop application, etc.—using one or more application programming interface (APIs), for example. The data centers 102 may include any number of sub-devices such as servers, network attached storage (NAS), APIs, other backend devices, and/or another type of sub-device. For example, the data centers 102 may include a plurality of computing devices (e.g., servers, storage, etc.) that may include or correspond to some or all of the components of the example computing device 600 of FIG. 6, described herein. In some embodiments, the host application 112 may execute using one or more graphics processing units (GPUs) and/or virtual GPUs to support a client application 122 executing on the client device(s) 104. In some embodiments, at least some of the processing of the data centers 102 may be executed in parallel using one or more parallel processing units, such as GPUs, cores thereof (e.g., CUDA cores), application specific integrated circuits (ASICs), vector processors, massively parallel processors, symmetric multiprocessors, etc. In embodiments where rendering is executed using the data centers 102, the data centers 102 may implement one or more ray-tracing and/or path-tracing techniques to increase the quality of images and/or video in a stream (e.g., where the client device 104 is capable of displaying high-definition—e.g., 4K, 8K, etc.—graphics, and/or the network characteristics currently support streaming of the same).

The data centers 102 may include one or more network devices 120—e.g., switches, routers, gateways, hubs, bridges, access points, etc.—that may be configured to direct traffic internal to a network of the data centers 102, direct incoming or ingress traffic from the Internet, direct outgoing or egress traffic to the Internet, and/or control, at least in part, routing of the network traffic through various autonomous systems of the Internet (e.g., via edge routers of the autonomous systems using the BGP protocol). For example, to direct ingress traffic from the Internet and/or egress traffic to the Internet, one or more core switches may be implemented to serve as a gateway to the Internet (and/or another WAN). The core switches may include import route maps (e.g., for egress network traffic) and/or export route maps (e.g., for ingress network traffic) that may be configured to aid in routing the network traffic coming to the data centers 102 and/or leaving from the data centers 102. In addition, the routing policies of the core switches—or other network devices 120—may include local preference values for particular egress ports and/or ingress ports that may be used by the system 100 to route traffic along a particular path (e.g., via a preferred DC ISP 110). In addition, although the network devices 120 primarily described herein are core switches, this is not intended to be limiting, and the techniques described herein for the core switches may be additional or alternatively implemented for other types of network devices 120 without departing from the scope of the present disclosure—such as distribution switches, edge switches, routers, access points, core layer devices, distribution layer devices, access layer devices, etc. In some embodiments, network configurator(s) 118 may be executed or deployed on the core switches directly—e.g., where the core switches or other network device(s) 120 support containerized applications.

As described herein, in some embodiments, once an application session has been initiated between the client device 104 and the data center 102—e.g., via the client application 122 and the host application 112—a quality of service (QoS) monitor 116 may monitor the quality of service of the application session over two or more DC ISPs 110, and may use the network configurator(s) 118 and the network device(s) 120 to direct routing across a selected DC ISP 110 (e.g., the DC ISP 110 with the best quality of service). In some examples, this may include switching from a current DC ISP 110 to a different or alternate DC ISP 110 to increase the QoS of the application session. In order to accomplish this, in some embodiments, internal policies of the network device(s) 120 may be updated to favor a particular DC ISP 110—e.g., by updating import route maps for BGP. In some examples, in addition to or alternatively from updating import route maps, export route maps may be updated—e.g., by prepending autonomous system prefixes to the BGP headers of packets—to influence ingress traffic from the client device(s) 104 to also be transmitted via a desired DC ISP 110. In some embodiments network protocol attributes may be changed in host application 112 to prefer one of the DC ISPs 110. For example, an attribute of the IP network protocol (e.g., a differentiated services code point (DSCP) field) may be changed which may cause traffic to be routed over a specific egress ISP. In such examples, network routing may be configured through policy based routing (PBR) that routes based on the DSCP values overriding the normal BGP routing (e.g., default or a BGP route that's been specified by the network configurators).

The data centers 102 may include a scheduler 114 to aid in performing network tests in tandem with a network tester 124 of the client device(s) 104 and/or to determine distribution and forwarding of application session host requests from a client device(s) 104 between and among other data centers 102. For example, where a scheduler 114 of a data center 102 determines that the data center 102 is not able to host the application session—e.g., due to capacity limits, congestion, resource deficiencies, load balancing, etc.—the scheduler 114 may route the request to other data centers 102 to find a suitable data center to host the application session. Once a suitable data center 102 is determined, connection information (e.g., an IP address) of the selected data center 102 may be sent to the client device(s) 104 such that the client device(s) 104 executes the application session using the selected data center 102.

The client device(s) 104 may include one or more end-user device types, such as a smartphone, a laptop computer, a tablet computer, a desktop computer, a wearable device, a game console, a smart-home device that may include an AI agent or assistant, a virtual or augmented reality device or system, and/or another type of device. In some examples, the client device(s) 104 may include a combination of devices (e.g., a smartphone and a communicatively coupled smart watch or other wearable device), and the client applications 122 associated therewith, including interactions with the host application 112, may be executed using one or more of the devices (e.g., smartphone application pushes notification to smartwatch application, user provides input to smartwatch, data representative of input is passed to another device of the system 100 via the smartphone).

The client device(s) 104 may include one or more input/output devices, such as a keyboard, a mouse, a controller(s), a touch screen, a display(s), a speaker(s), a microphone, headphones, a headset (e.g., AR, VR, etc. that may provide inputs based on user movement), and/or other input/output device types. As such, in some embodiments, the application session may include a streams of data from the client device(s) 104 to the data center(s) 102 and from the data center(s) 102 to the client device(s) 104. The streams of data may include, without limitation, an audio stream from the client device(s) 104, an audio stream from the data center(s) 102, a video stream from the data center(s) 102, an input stream from the client device(s) 104, and/or other stream types.

The client device(s) 104 may include the client application 122 that may execute—along with the host application 112—an application session. As an example, where the client application 122 and the host application 112 support cloud gaming, the client application 122 may access an API of the host application 112 to execute an instance of a particular game (e.g., an application session). As such, in embodiments, the application specific tests executed by the network tester 124 may correspond to the particular type of game being played using the cloud gaming system. Similarly, the application session for cloud VR may correspond to a cloud VR instance, the application session for remote desktop may correspond to a remote desktop instance, etc. In any embodiments, the applications may be executed using real-time streaming of data—e.g., to satisfy the high-performance, low latency nature of the applications. As such, the network tests may correspond to real-time streaming. For example, the application specific tests may be executed such that a suitable data center is capable of executing real-time streaming of the application session data.

The network tester 124 may execute, or cause the execution of (e.g., by the data center(s) 102), one or more network tests. For example, the network tests may include a latency test, a jitter test, a packet loss test, a bandwidth test, another test type, or a combination thereof. In some examples, the network tests may be used to generate an application profile using the profile generator 126. For example, for a given client application 122, application session, sub-application or program within the client application 122, etc., the network tester 124 may execute application specific tests to determine the capability of the client device(s) 104 and the associated local network (e.g., including Wi-Fi, Ethernet, the client ISP 108, or a combination thereof) for executing the client application 122—or an application session thereof. In some embodiments, the profile generator 126 may generate a profile at the application level—e.g., for cloud gaming, the application profile may be used for any use of the client application 122, such as for first person shooter type games, sports games, strategy games, and any other game types. In other embodiments, the application profile may be sub-application type specific—e.g., for cloud gaming, a first application profile may be generated for first person shooter type games, a second application profile for sports games, and so on. In further embodiments, the application profile may correspond to each separate program the client application 122 executes—e.g., for cloud gaming, an application profile may be generated for each individual game, and for deep learning, an application profile may be generated for each neural network model or deep learning framework, etc. In another embodiment, the application profile may correspond to inter-program types—e.g., for a first person shooter game in a cloud gaming environment, a first application profile may be generated for a capture the flag game type within the first person shooter game and a second application profile may be generated for a team death match game type. As such, the application profile may be generated by the profile generator 126—and based on the network tests performed by the network tester 124—for different levels of granularity within the client application 122.

The application profile may correspond to a quality of the stream that the client device(s) 104 can effectively support during gameplay. For example, the application profile may include information such as an image resolution (e.g., 720p, 1080p, 4K, 8K, etc.), a bit rate, audio quality (e.g., to and from the client device(s) 104), and/or other information—as described herein—that may be informative to the system 100 when selecting a suitable data center 102 for the application session, and informative to the selected data center 102 to determine a quality of the stream to the client device(s) 104—e.g., to send a highest quality stream supported to not degrade performance, but also to not send too high quality of a stream that the client device(s) 104 and/or the associated local network could not support. As such, the application profile may be used to satisfy quality expectations and requirements of a particular user for a particular application session, and also to load balance (e.g., pass application sessions to less congested data centers 102) and conserve resources (e.g., don't allot an entire GPU for the application session when a partial, or virtual GPU (vGPU), is acceptable) at the data centers 102.

As such, the application profile may be stored—in embodiments—on the client device(s) 104 such that when submitting a request for a host of the application session to one or more data centers 102, the application profile (or information corresponding thereto) may be included in the request. In some embodiments, the application profile may additionally or alternatively be stored on one or more data centers 102 (or an alternative device not illustrated, such as another computing device of a web support platform that may maintain application profiles for users). In any example, the application profile may be associated with an identity management system (IDS) of the system 100.

In some embodiments, the application profile may correspond to the results of the network tests. For example, the application profile may include a latency value, a packet loss value, a jitter value, a bandwidth value, and/or other values, and this information may be used by the data center 102 hosting the application session to determine the quality of the stream (e.g., video stream, audio stream to the client device(s) 104, audio stream from the client device(s) 104, input stream from the client device(s) 104, etc.). In other embodiments, the application profile may correspond to the known (or tested for) supported quality of the stream, and may include data for image quality (e.g., standard dynamic range (SDR) vs. high dynamic range (HDR)), audio quality, encoding, etc. For example, the application profile may include information corresponding to (or may be used to determine information corresponding to) encoder settings, an encoding protocol (e.g., real time messaging protocol (RTMP), common media application format (CMAF), etc.), a video codec type, a frame rate, a keyframe sequence, an audio codec, a bit rate encoding type, a bit rate, a pixel aspect ratio (e.g., square, 4:3, 16:9, 24:11, etc.), a frame type (e.g., progressive scan, two B-frames, one reference frame), an entropy coding type, an audio sample rate, an audio bit rate, and/or other settings.

Figure 2A:
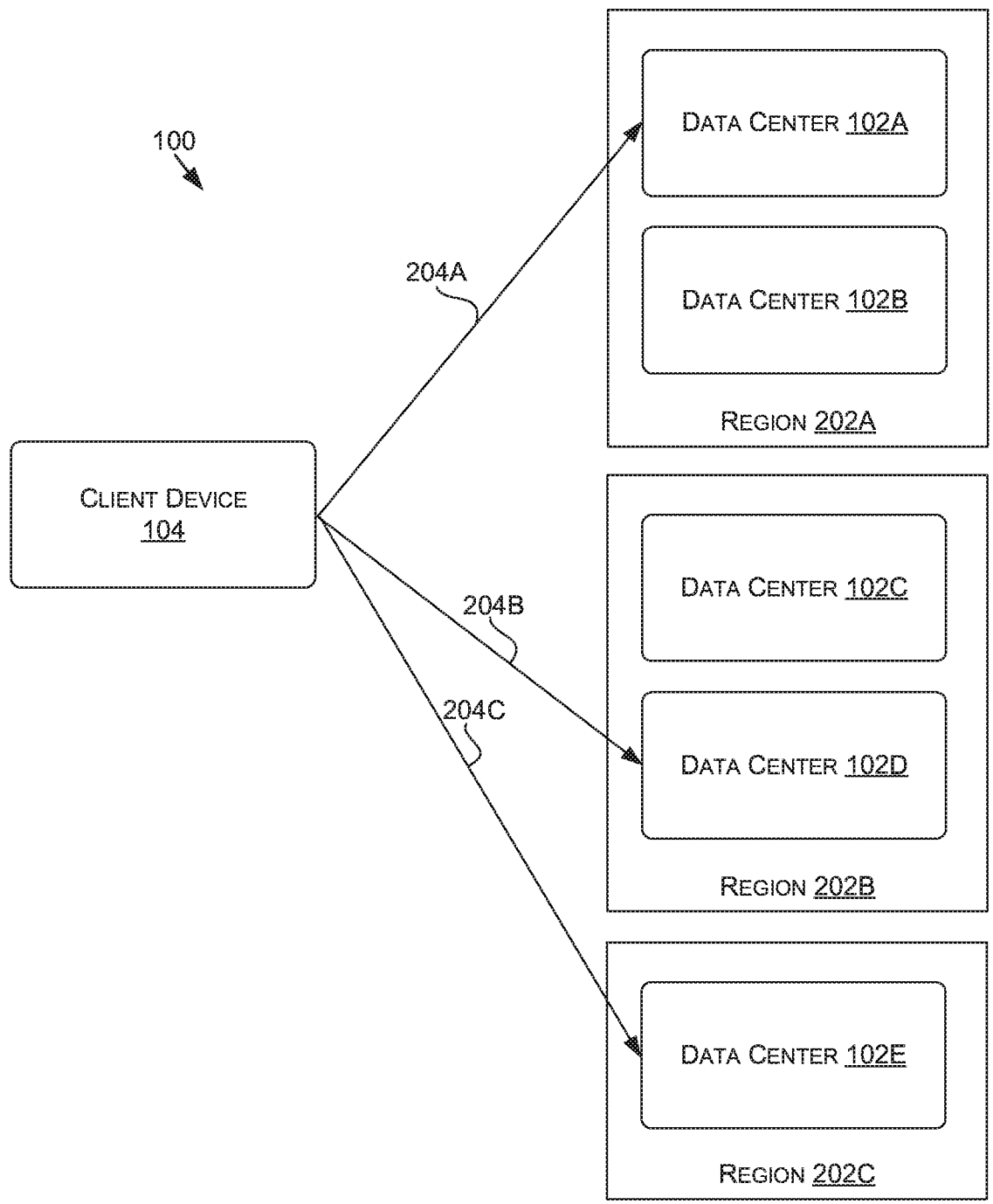
FIG. 2A depicts an example illustration of a network test environment for application session host requests, in accordance with some embodiments of the present disclosure.

In order to conduct the network test(s), and with reference to FIG. 2A, the network tester 124 of the client device(s) 104 may execute a preliminary network test—e.g., for latency—between the client device 104 and a plurality of data centers 102. For example, the client device 104 may query—e.g., via request signals 204A, 204B, and 204C—an exposed API to determine the data centers 102 available to the client device 104, and the client device 104 may execute (or cause each of the data centers 102 execute) a preliminary network test. In some embodiments, as illustrated, the API may return DNS information for regions (e.g., regions 202A, 202B, and 202C, which may correspond to regions of a state, country, continent, etc.), and the request signals 204 may be directed to a region-based IP address. Once the request signal 204 is received, the request signal 204 may be forwarded to a specific data center within the region. The selection of a data center 102 within the region may be based on an alternating selection—e.g., for region 202A, a first request signal 204 from a first client device 104 may be passed to data center 102A, a second request signal 204 from a client device 104 may be passed to data center 102B, a third request signal 204 may be passed to the data center 102A, and so on. In other embodiments, the selection of the data center 102 for the region 202 may be based on congestion, capacity, compute resources, hardware types, etc., at each of the data centers 102 in the region 202. Using regions instead of directing requests to each data center may reduce the run-time of the tests as less tests need to be performed (e.g., data centers 102 of the same region may be assumed to have the same performance characteristics). In some embodiments, however, the exposed API may provide specific data center addresses to the client device 104, and the request signals 204 may not be region-based.

Where the preliminary test is for latency, the preliminary network test may return latency values for each of the data centers 102—e.g., one or more packets may be transmitted to the data centers 102 from the client device 104, one or more packets may be transmitted from the data centers 102 to the client device 104, or a combination thereof, and the time of transmission may be computed to determine latency scores. Once the latency values are known, the client device 104 may select—or a scheduler of one or more data centers 102 may select—an initial host data center 102 for the client device 104 to perform network testing. For example, the data center 102 with the lowest latency may be selected, any of the data centers 102 under a latency threshold may be selected, and/or another selection criteria may be used.

Once a data center 102 is selected, the client device 104 may transmit another request signal 204 to the selected data center 102 to execute one or more additional network tests. For example, where the data center 102A is selected, the client device 104 may transmit a request for a jitter test, a packet loss test, a bandwidth test, a latency test, and/or another type of test to the data center 102A. The scheduler 114 of the data center 102 and/or the network tester 124 of the client device 104 may then execute one or more network tests. In some embodiments, the network tests may be executed using application specific traffic, as described herein. For example, when executing a bandwidth test, a standard, non-application specific bandwidth test may not return accurate results for a low latency, high performance game within a cloud gaming environment. This may be a result of a standard bandwidth test not resembling the bursty network traffic associated with the game. For example, with a high latency connection for a low latency game, by the time an input to the client device 104 is transmitted to the hosting data center 102, the video stream is updated, and received and displayed by the client device 104, the visual may be too late—resulting in a poor experience or causing the user to perform poorly in the game. To account for this, when requesting the bandwidth test, the request may indicate the game that the network test corresponds to, and the data center 102A may generate simulated network traffic corresponding to the game. As such, the test results of the bandwidth of the local network of the client device 104 may more accurately reflect the bandwidth of the network for the particular game. This bandwidth information may then be associated with the application profile for the client device 104. Similarly, other tests may be executed using simulated application specific traffic in order to generate an application profile that corresponds directly to the ability of the client device 104 and the associated local network to support application sessions of the application (e.g., game instances of the game in a cloud gaming environment).

The application profile may be updated periodically. For example, the application profile may be updated at a recurring interval—e.g., every week, every month, etc.—and/or may be updated based on network characteristic changes. For example, when a new data center 102 becomes available to the client device 104, the application profile may be updated in view of the new data center 102. As another example, where a local network of the client device 104 changes—e.g., due to the user moving the client device 104 to a new location, updating their home network, etc.—the application profile may be updated.

In some embodiments, user-facing information may be generated based on the network tests. For example, where the network connection is not strong, the bandwidth is low, etc., a recommendation may be generated for the user indicating—where the user device 104 is connected over Wi-Fi—to move closer to the router, use 5 ghz instead of 2.4 ghz, or vice versa, etc. As another example, a recommendation may be to have the user adjust settings of their device, to upgrade their Internet speed with the client ISP 108, etc. As such, once the user makes updates, the network tests may be run again in an effort to more accurately determine the client device 104 and the associated networks capabilities to have optimal quality settings for the user for the application.

Figure 2B:
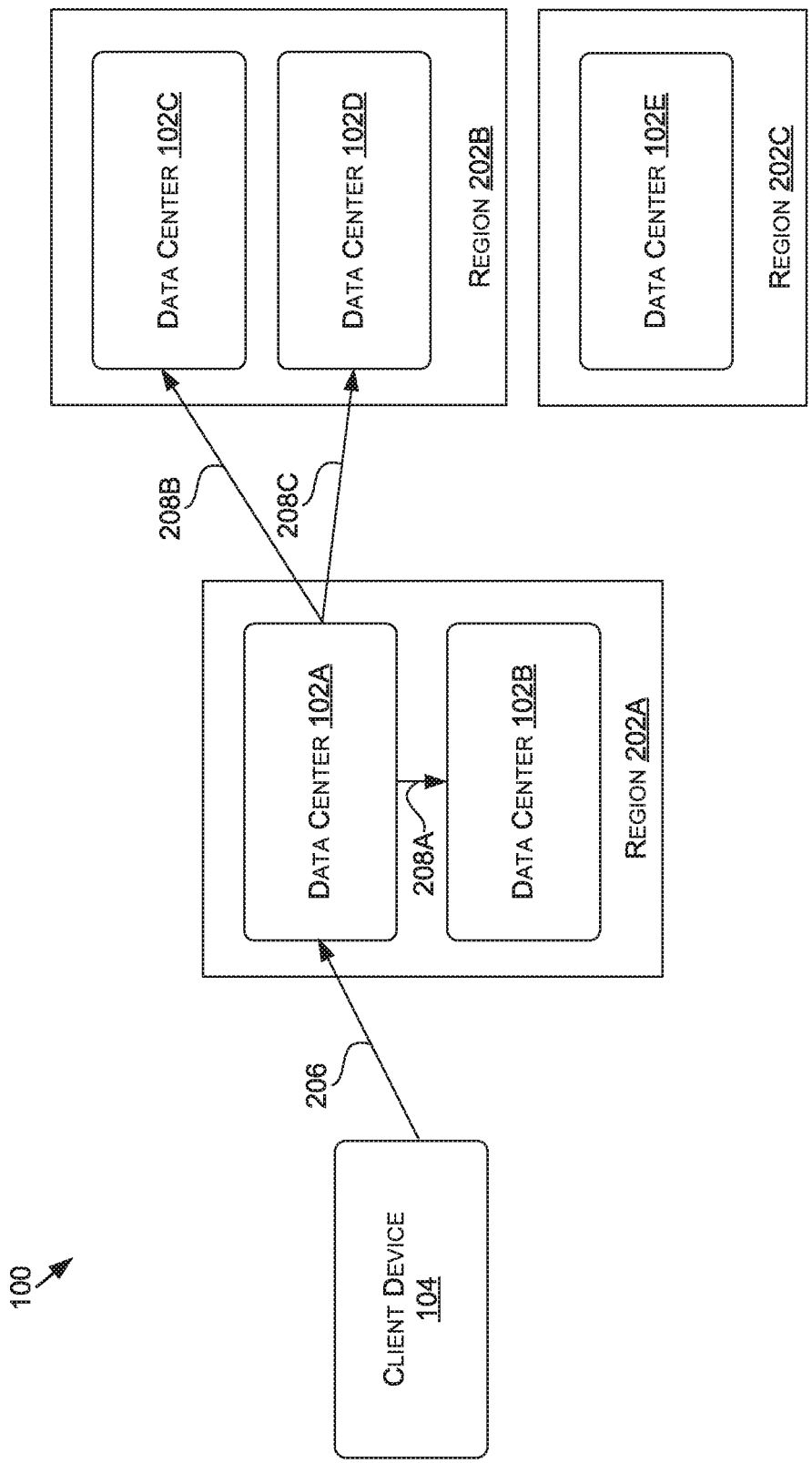
FIGS. 2B-2C depict example illustrations of application session distribution and forwarding, in accordance with some embodiments of the present disclosure.

Now referring to FIG. 2B, once an application profile has been generated, the client device 104 may transmit a host request signal 206 to a data center 102 requesting that the data center 102, or another data center 102, host an application session. For example, when a user provides an input to the client device 104 indicating that the user wants to launch an application session (e.g., wants to participate in an instance of a game in a cloud gaming environment), the client device 106 may generate and transmit the host request signal 206. In some embodiments, similar to the description with respect to FIG. 2A, a preliminary network test—e.g., a latency test—may be conducted to determine and select a data center 102A to transmit the host request signal 206. Once a selected data center 102A is determined, the host request signal 206 may be transmitted to the data center 102A. The preliminary network test may return more than one suitable data center 102 (e.g., more than one data center 102 having acceptable latency). In such examples, the host request signal 206 may include data corresponding to addresses (e.g., IP addresses) of the other suitable data centers 102, which may be used by the data center 102A to determine where to send forward request signals 208. In some embodiments, the host request signal 206 may further include data corresponding to the application profile of the client device 104 such that the data center 102A may determine the quality of the streams, whether the data center 102A can host the application session, and/or can include the application profile information in the forward request signals 208.

The scheduler 114 of the data center 102A may receive the host request signal 206, and determine whether to host or forward the application session. In some embodiments—and based on data in the host request signal 206—the scheduler 114 may determine the application type (or program type, such as a particular game or a game type) and associated application performance requirements. For example, for a particular application to execute properly or effectively, the application may require a latency below a threshold value, a bit rate above a threshold value, etc., and this information may be used—in conjunction with the performance requirements from the application profile—to determine whether the data center 102A can host the application session. Where the data center 102A cannot host the application session, the application performance requirements, application profile information, and/or other information may be included in the forward request signals 208 to other data centers 102.

The scheduler 114—e.g., based on a determination that the data center 102A cannot host the application session—may transmit one or more forward request signals 208 to other suitable data centers 102. The suitable data centers 102 may be determined, in embodiments, based on the data from the host request signal 206 from the client device 104 that included data corresponding to other data centers 102 that satisfied one or more values (e.g., latency values) from the preliminary network test(s). In some embodiments, in addition to or alternatively from the result of the preliminary network tests, the suitable data centers 102 may be selected based on application performance requirements (e.g., it may be known that certain data centers 102 cannot support particular applications), network performance requirements (e.g., it may be known that certain data centers 102 cannot support the quality of streams that a client device 104 and the associated network can handle, or that DC ISPs 110 of certain data centers 102 do not interact well with the client ISP 108), hardware limitations (e.g., it may be known that certain data centers 102 do not have hardware for generating streams of required quality, which may include GPUs, CPUs, memory, a particular model or capability of a GPU, CPU, or memory, etc.). In the example of FIG. 2B, the suitable data centers 102 may include the data centers 102B, 102C, and 102D, and the data center 102E may have been determined not to be suitable (e.g., the latency may be too high, due to the data center 102E being in the region 202C that may be a far distance—e.g., 500+ miles—from a location of the client device 104, the data center 102E may not have the requisite hardware to generate a high-quality stream, such as a video stream generated using ray-tracing or path-tracing techniques, etc.). The same reasons another data center 102—such as the data center 102E—may not be suitable, may also be analyzed by the selected data center 102A to determine that the data center 102A cannot host the application session.

The forward request signals 208 may be transmitted all at once to each suitable data center 102, to a subset of the suitable data centers, etc., or may be transmitted to one suitable data center 102 at a time, and to additional data centers 102 based on denials of the forward request signals 208. Where the forward request signals 208 are transmitted individually, the order in which the forward request signals 208 are transmitted may be determined based on the preliminary network test data (e.g., lowest latency first, highest latency last), distance from the data centers (e.g., closest data centers 102 to the data center 102A first, furthers data centers 102 from the data center 102A last), and/or some other criteria. For example, a data center 102 may always forward to a data center in the same region 202 first, and then may consider other regions 202 when none of the data centers 102 in the region 202 accept the forward request from the forward request signal 208.

The forward request signals 208 may be analyzed by the schedulers 114 of the receiving data centers 102, and the schedulers 114 may determine—in view of all of the information available—whether the data center can host the application session. If the data center 102 cannot host the application session, the data center 102 may return a denial signal (not illustrated) to the data center 102A. In the example of FIG. 2B, the data centers 102B and 102C may deny the forward request, and the data center 102D may accept the forward request signal. Once accepted, the scheduler 114 of the data center 102A may receive this information, and transmit an acceptance signal (not illustrated) to the client device 104. The acceptance signal may include data representative of an address of the data center 102D such that the client device 104 may establish a communicative coupling to the data center 102D, and the data center 102D may host the application session between the client application 122 and the host application 112 executing on the data center 102D.

Figure 2C:
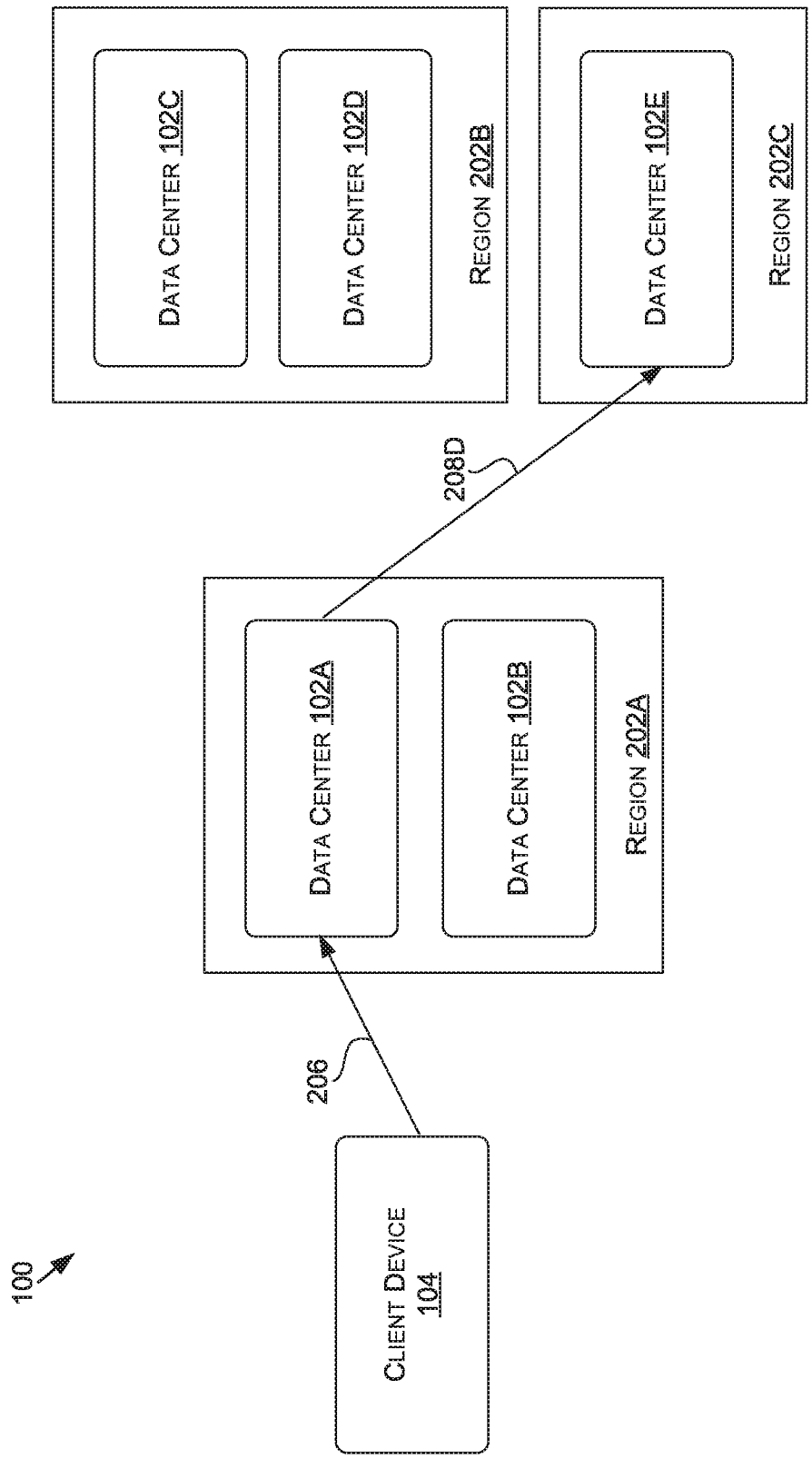

With reference to FIG. 2C, in some embodiments, the data center 102A may be suitable for hosting the application session—e.g., the data center 102A may have the requisite hardware, network characteristics, etc. to host the game without degradation—but may still forward the request to another data center 102. For example, the data center 102A may also monitor for congestion and, when the data center 102A—based on historical data or currently available data (e.g., a large queue of users or a large wave of users who have recently requested initialization of the application)—anticipates a spike in traffic at a current time, or a future time during which the application session may be hosted, the data center 102A may attempt to forward the request (e.g., via forward request signal 208D) to another suitable data center 102 that does not have the same congestion issues but still satisfies the quality of service requirements of the application session. For example, the scheduler 114 of the data center 102A may store historical data of other data centers, and may determine a data center having less congestion (e.g., data center 102A may be on the West Coast of the United States and the host request signal 206 may be received at 9:00 PM PST, when heavy traffic is normal; however, the data center 102E may be on the East Coast of the United States where it is 12:00 PM EST and the traffic is lighter). In some embodiments, in addition to or alternatively from congestion or anticipated traffic, the performance requirements of the application session may be taken into account when determining whether to forward the request. For example, where a game does not require low latency, the data center 102A may save itself for users playing latency sensitive games and pass the request to the data center 102E to host the application session—e.g., because the data center 102E may satisfy the latency requirements of the game even though further from the client device 104. As such, in addition to determining whether or not the data centers 102 can support the performance requirements of the application session without degradation, the scheduler 114 may analyze additional factors to determine whether to host the application session locally or forward the application session to another data center 102.

Figure 2D:
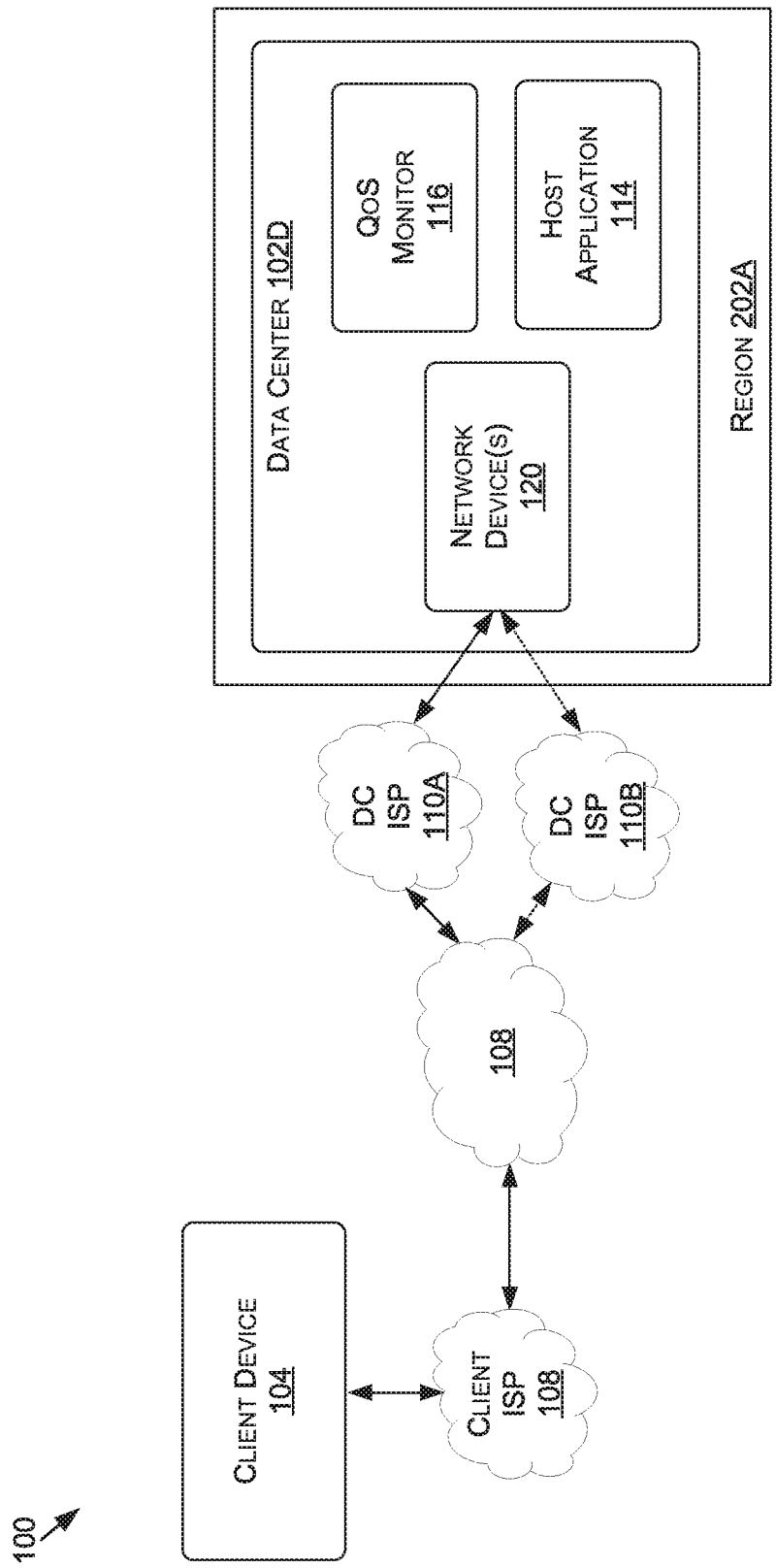
FIG. 2D depicts an example illustration of internet service provider (ISP) switching based on in-stream quality of service (QoS) feedback, in accordance with some embodiments of the present disclosure.

With reference to FIG. 2D, once an application session has been initiated, QoS metrics may be monitored by the QoS monitor 116 to determine network traffic routing settings for the application session. For example, different DC ISPs 110 may perform better for the data center 102D than other DC ISPs 110, and the performance of the different DC ISPs 110 may be monitored during the application session to determine whether any routing updates should be made. As such, the current DC ISP 110A may be monitored for QoS (e.g., for application session yield or other application quality metrics) and the DC ISP 110B may be monitored for the same or similar metrics. Internal network quality issues for the DC ISPs 110 may adversely affect performance of the application session, and the network configurator(s) 118 of the data center 102D may receive an indication from the QoS monitor 116 that network traffic should be switched away from the DC ISP 110A and to the DC ISP 110B. As such, if the application session performance falls below a threshold, and the performance over another DC ISP 110 is better, the QoS monitor 116 may submit an alert to switch network traffic to a network path that includes the better performing DC ISP 110B. In some embodiments, the application performance metrics may be queried from application streaming metrics by the QoS monitor.

The QoS monitor 116 may monitor network and/or application performance using network performance metrics (e.g., latency, packet loss, jitter, cost associated with different DC ISPs 110, capacity associated with different DC ISPs 110, etc.) and/or application performance metrics (e.g., streaming session yield, application QoS metrics, etc.) as inputs. These inputs may be determined by transmitting test probes (e.g., pings) and/or simulating application specific network traffic between and among the client device 104 and the data center 102, and analyzing the resulting communications to determine the network and/or application performance metrics. For example, a REST interface (e.g., an API) may be exposed to enable the QoS monitor 116 to publish network path information such as an actual path information (e.g., which autonomous systems are configured for communication with other autonomous systems), network performance metrics (and/or data that may be analyzed to determine the same), and/or application performance metrics (or data that may be analyzed to determine the same).

The QoS monitors 116 may be distributed within the system 100 depending on the type of network traffic information and/or the devices that the network traffic is to be monitored between. As such, the QoS monitor 116 may include a monitor executing on the data center 102 (e.g., for monitoring egress and/or ingress traffic between the data center 102 and the client device(s) 104, and communicating information back to the QoS monitor 116 of the client device 104) and/or a QoS monitor 116 executing on the client device(s) 104 (e.g., for testing traffic between the client device(s) 104 and the data center 102, and communicating information back to the QoS monitor 116 of the data center 102). In some embodiments, a single QoS monitor 116 may be split among two or more of the data centers 102 and/or the client device(s) 104. For example, a first portion of a QoS monitor 116 may execute on the data center 102 and a second portion may execute on the client device 104, and communications may be exchanged between the two for monitoring various network paths and testing end-to-end network and/or application performance metrics.

Once an updated routing path is determined, the changes in network routing may be published or posted as messages to the network configurator(s) 118. The network configurator(s) 118 may implement the routing updates on target network endpoints (e.g., network device(s) 120), such as by updating import route maps and/or export route maps of core switches (e.g., by updating local preference values for a particular egress port and/or prepending autonomous system prefixes to export route maps for controlling ingress traffic using a route injector(s)).

Figure 3:
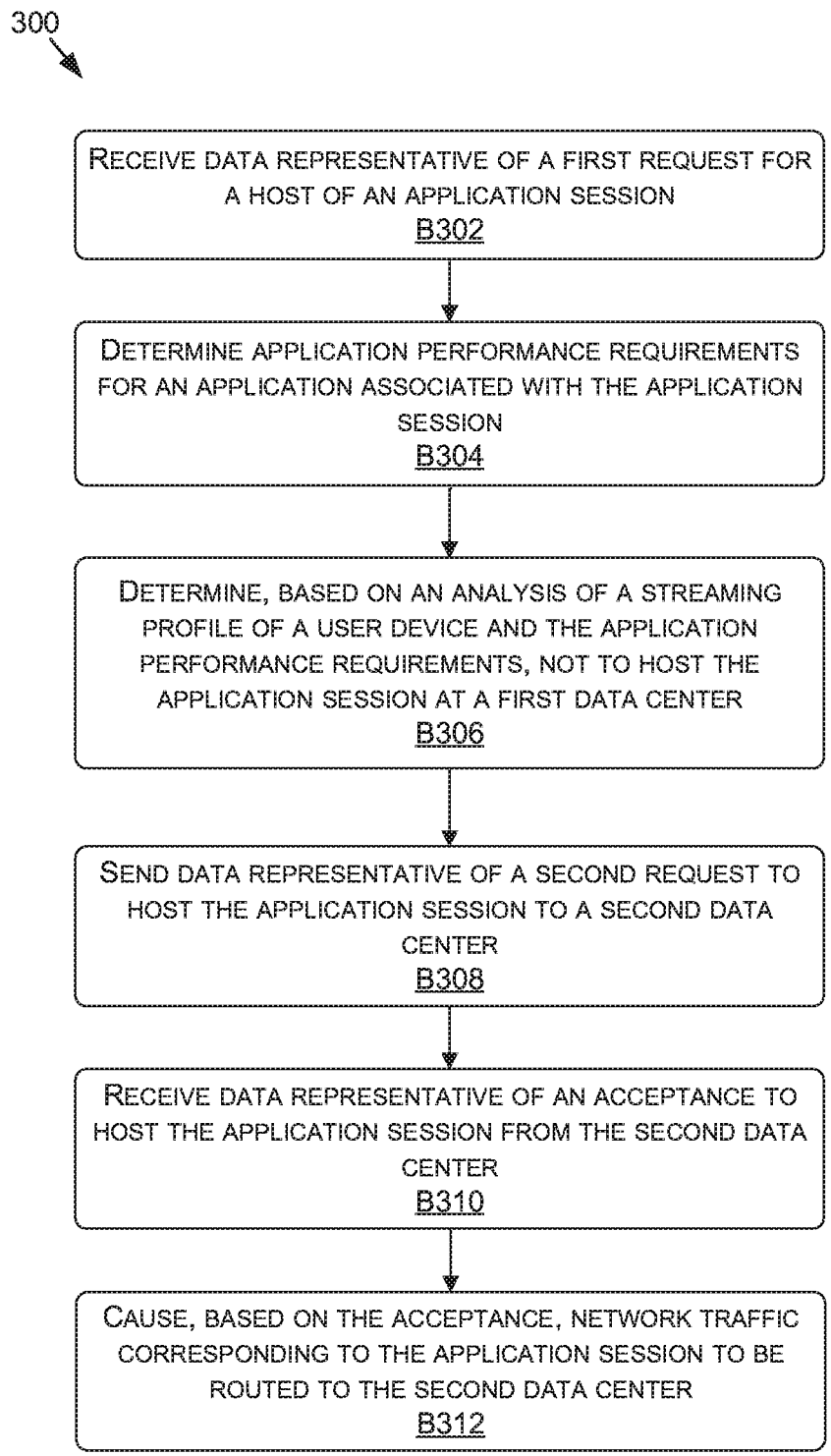
FIG. 3 is a flow diagram showing a method for application session distribution and forwarding, in accordance with some embodiments of the present disclosure.
Figure 4:
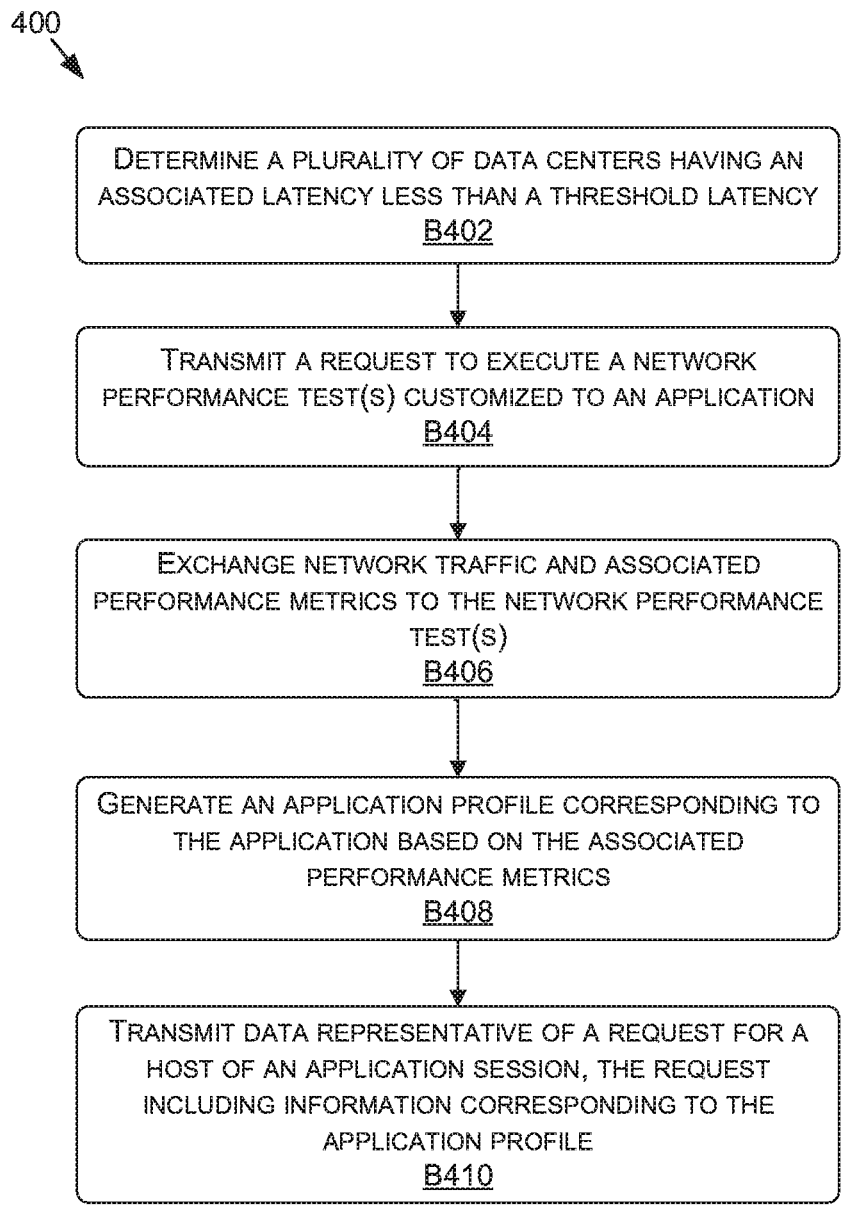
FIG. 4 is a flow diagram showing a method for application profile generation, in accordance with some embodiments of the present disclosure.

Now referring to FIGS. 3-4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to the system 100 of FIG. 1. However, these methods may additionally or alternatively be executed by any one system, or any combination of systems, including, but not limited to, those described herein.

Now referring to FIG. 3, FIG. 3 is a flow diagram showing a method 300 for application session distribution and forwarding, in accordance with some embodiments of the present disclosure. The method 300, at block B302, includes receiving data representative of a first request for a host of an application session. For example, the data center 102A may receive the host request signal 206 from the client device 104, which may include data indicating the application type (e.g., the specific game) and the application profile for the client device 104.

The method 300, at block B304, includes determining application performance requirements for an application associated with the application session. For example, the data center 102A may determine the application type—or the program type, such as a specific game in a game streaming environment—and the associated performance requirements for the application (e.g., latency, hardware, etc.).

The method 300, at block B306, includes determining, based on an analysis of a streaming profile of a user device and the application performance requirements, not to host the application session at a first data center. For example, the data center 102A may determine not to host the application session based on determining that the network quality, hardware resources, congestion issues, and/or other criteria are not satisfied that would allow the application performance requirements and the application profile requirements to be met.

The method 300, at block B308, includes sending data representative of a second request to host the application session to a second data center. For example, the data center 102A may transmit a forward request signal 208 to the data center 102B including data corresponding to the application performance requirements and the application profile performance requirements.

The method 300, at block B310, includes receiving data representative of an acceptance to host the application session from the second data center. For example, the data center 102A may receive an acceptance signal from the data center 102B in response to the forward request signal 208.

The method 300, at block B312, includes causing, based on the acceptance, network traffic corresponding to the application session to be routed to the second data center. For example, the data center 102A may transmit data to the client device 104 indicating that the application session will be hosted by the data center 102B, and the application session may be executed using the data center 102B—e.g., network traffic corresponding to the application session may be transmitted to the data center 102B.

With reference now to FIG. 4, FIG. 4 is a flow diagram showing a method 400 for application profile generation, in accordance with some embodiments of the present disclosure. The method 400, at block B402, includes determining a plurality of data centers having an associated latency less than a threshold latency. For example, the client device 104 may execute a preliminary network test with a plurality of data centers 102 to determine suitable data centers for an application session.

The method 400, at block B404, includes transmitting a request to execute a network performance test(s) customized to an application. For example, once a data center 102 is selected, the client device 104 may transmit a request for executing one or more network tests using simulated traffic for the application that will be the subject of an application session.

The method 400, at block B406, includes exchanging network traffic and associated performance metrics to the network performance test(s). For example, data representing application network traffic may be transmitted between the client device 104 and the data center 102, and data gleaned from the tests may be shared between and among the devices.

The method 400, at block B408, includes generating an application profile corresponding to the application based on the associated performance metrics. For example, the profile generator 126 may generate an application profile corresponding to the application type (or sub-program thereof) based on the associated performance metrics from the network test(s) (e.g., latency, packet loss, jitter, bandwidth, etc.). For example, video stream quality, audio stream quality, input stream quality, and/or other quality determination may be made.

The method 400, at block B410, includes transmitting data representative of a request for a host of an application session, the request including information corresponding to the application profile. For example, the application profile information may be included in a host request signal 206 to a data center 102 when finding a suitable host for an application session.

Example Game Streaming System

Figure 5:
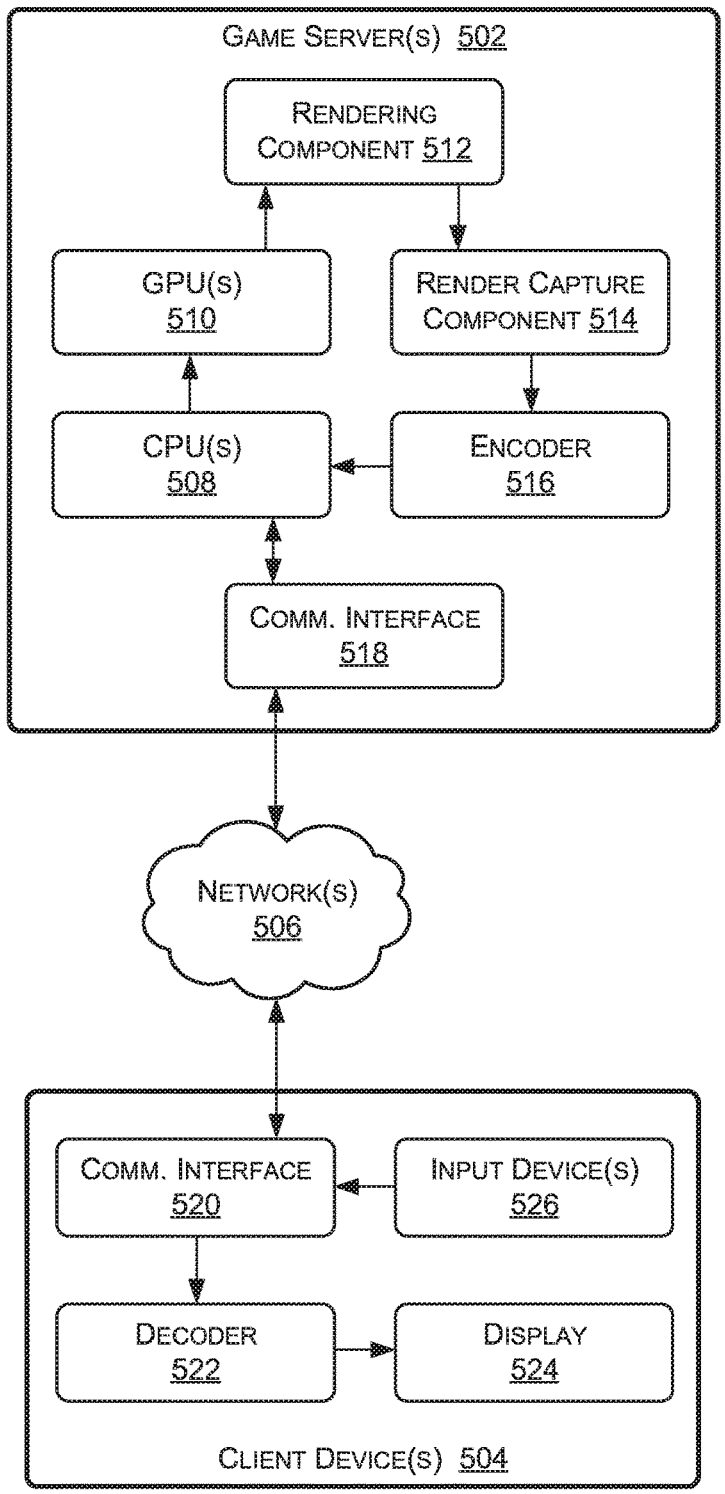
FIG. 5 is a block diagram of an example game streaming system suitable for use in implementing some embodiments of the present disclosure.

Now referring to FIG. 5, FIG. 5 is an example system diagram for a game streaming system 500, in accordance with some embodiments of the present disclosure. FIG. 5 includes game server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented.

In the system 500, for a game session, the client device(s) 504 may only receive input data in response to inputs to the input device(s), transmit the input data to the game server(s) 502, receive encoded display data from the game server(s) 502, and display the display data on the display 524. As such, the more computationally intense computing and processing is offloaded to the game server(s) 502 (e.g., rendering—in particular ray or path tracing—for graphical output of the game session is executed by the GPU(s) of the game server(s) 502). In other words, the game session is streamed to the client device(s) 504 from the game server(s) 502, thereby reducing the requirements of the client device(s) 504 for graphics processing and rendering.

For example, with respect to an instantiation of a game session, a client device 504 may be displaying a frame of the game session on the display 524 based on receiving the display data from the game server(s) 502. The client device 504 may receive an input to one of the input device(s) and generate input data in response. The client device 504 may transmit the input data to the game server(s) 502 via the communication interface 520 and over the network(s) 506 (e.g., the Internet), and the game server(s) 502 may receive the input data via the communication interface 518. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 512 may render the game session (e.g., representative of the result of the input data) and the render capture component 514 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 502. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
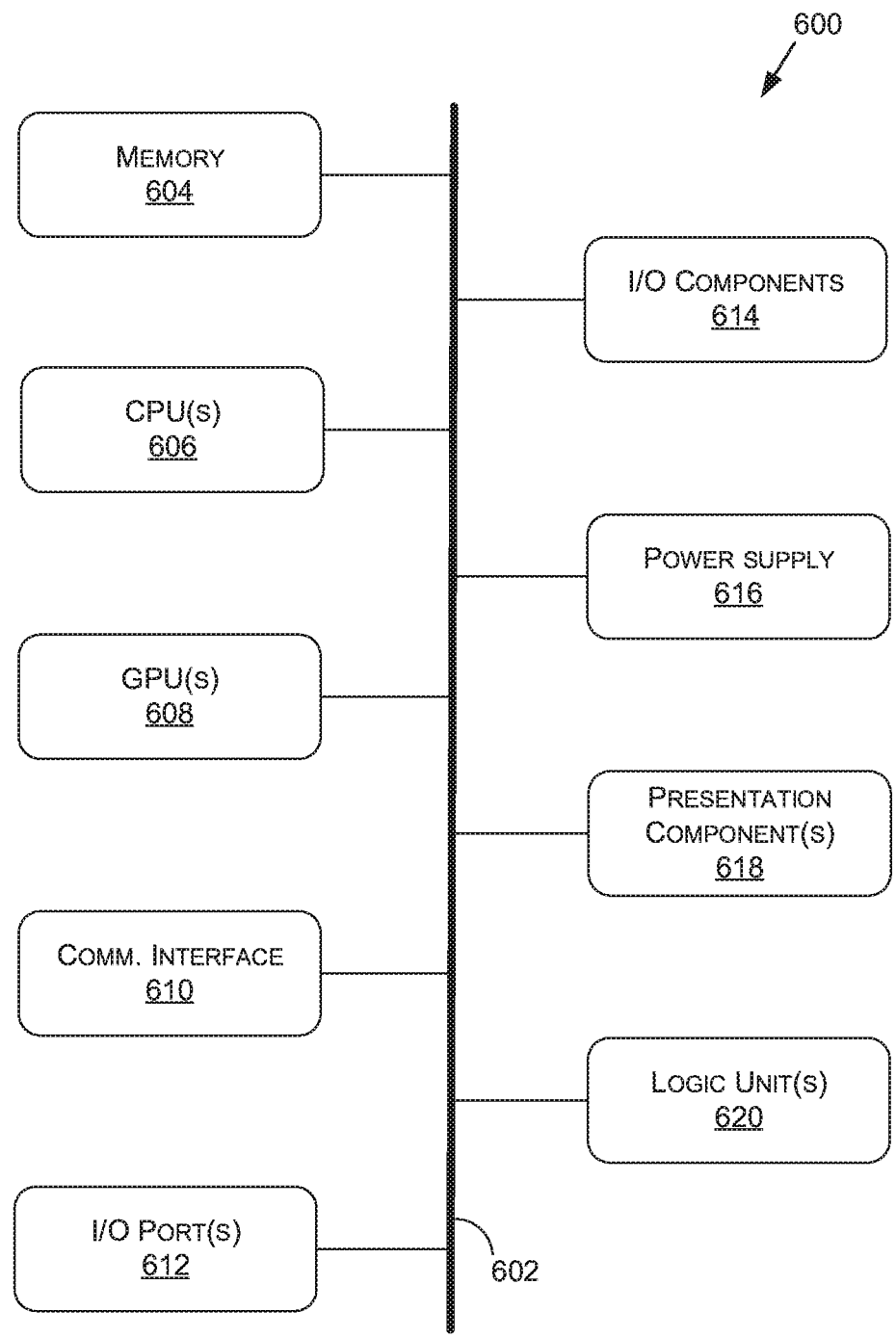
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving, using a first data center, a first request for a host of an application session and a streaming profile from a user device, the streaming profile being generated based at least on one or more first network tests between the user device and the first data center and one or more second network tests between the user device and a second data center;
   determining, based at least on the first request, one or more application performance requirements for an application associated with the application session;
   determining, based at least on an analysis of the streaming profile and the one or more application performance requirements, to request to host the application session using the second data center;
   based at least on the determining to host the application session using the second data center, sending a second request to host the application session to the second data center;
   receiving an acceptance to host the application session from the second data center; and
   causing, based at least on the acceptance from the second data center, network traffic corresponding to the application session to be routed to the second data center.

2. The method of claim 1, wherein the streaming profile includes at least one or more first metrics associated with a first network connection between the user device and the first data center and one or more second metrics associated with a second network connection between the user device and the second data center, the one or more first metrics determined using the one or more first network tests and the one or more second metrics determined using the one or more second network tests.

3. The method of claim 1, wherein at least one of the one or more first network tests or the one or more second network tests include one or more of a jitter test, a packet loss test, a bandwidth test, or a latency test.

4. The method of claim 1, wherein the application is a game application, the application session is a game instance of the game application, and the first data center and the second data center are associated with a cloud gaming environment.

5. The method of claim 1, wherein the first data center and the second data center are determined based at least on the one or more first network tests and the one or more second network tests.

6. The method of claim 1, further comprising:
   sending, to a third data center and prior to the sending the second request, a third request to host the application session; and
   receiving, using the first data center and from the third data center, an indication that the third data center denied the third request,
   wherein the sending the second request is further based at least on the third data center denying the third request.

7. The method of claim 1, further comprising:
   determining not to host the application session using the first data center is further based at least on at least one of:
     forecasting congestion of the first data center during the application session;
     insufficient hardware at the first data center to support the application session; or
     a lack of compute capacity at the first data center,
   wherein the determining to request to host the application session using the second data center is further based at least on the determining not to host the application session using the first data center.

8. The method of claim 1, further comprising:
   testing quality of service metrics for a current internet service provider (ISP) of the second data center and an alternative ISP of the second data center;
   determining, based at least on the quality of service metrics, that the alternative ISP is associated with better network performance characteristics relative to the current ISP; and
   updating one or more routing policies at the second data center to cause at least one of ingress traffic or egress traffic to be routed away from the current ISP and through the alternative ISP.

9. The method of claim 1, wherein:
   the one or more application performance requirements include at least a network threshold associated with the application;
   the streaming profile includes at least a metric associated with a network connection between the user device and the second data center; and
   the determining to request to host the application session using the second data center comprises determining, based at least on the analysis of the streaming profile and the one or more application performance requirements, that the metric satisfies the network threshold.

10. The method of claim 1, further comprising:
    determining, based at least on the analysis of the streaming profile and the one or more application performance requirements, not to host the application session using the first data center,
    wherein the determining to request to host the application session using the second data center is further based at least on the determining not to host the application session using the first data center.

11. A method comprising:
    exchanging, using a user device and with a first data center, first data during one or more first tests associated with a first network connection between the user device and the first data center;
    exchanging, using the user device and with a second data center, second data during one or more second tests associated with a second network connection between the user device and the second data center;
    generating, using the user device and based at least on the one or more first tests and the one or more second tests, an application profile representing one or more first metrics associated with the first network connection with the first data center and one or more second metrics associated with the second network connection with the second data center;
    sending, using the user device and to at least the first data center, a request for a host of an application session associated with an application and the application profile; and establishing, using the user device, the application session with at least one of the first data center or the second data center.

12. The method of claim 11, wherein the one or more first tests and the one or more second tests include at least one of a jitter test, a packet loss test, a bandwidth test, or a latency test.

13. The method of claim 11, wherein the request further indicates an application type of the application, and the method further comprises:
receiving an indication that at least one of the first data center or the second data center has compute resources capable of hosting the application type according to the application profile.

14. The method of claim 11, further comprising:
communicating, during the application session, via a first internet service provider (ISP) of the second data center;
receiving, from the second data center, updated routing information; and
communicating, based at least on the updated routing information, via a second ISP of the second data center.

15. The method of claim 14, wherein the updated routing information is based at least on quality of service metrics associated with the application session for the first ISP and the second ISP.

16. The method of claim 11, further comprising identifying, using the user device, the first data center and the second data center for hosting the application session based at least on the one or more first metrics associated with the first network connection and the one or more second metrics associated with the second network connection.

17. The method of claim 11, wherein at least one of:
the first data center accepts to host the application session based at least on the one or more first metrics associated with the first network connection satisfying one or more application performance requirements associated with the application; or
the second data center accepts to host the application session based at least on the one or more second metrics associated with the second network connection satisfying the one or more application performance requirements associated with the application.

18. A system comprising:
one or more processing units to:
receive, using a first data center and from a user device, a first request for a host of an application session and a streaming profile, the streaming profile being generated based at least on one or more network tests performed between the user device and one or more second data centers;
determine, based at least on the first request, one or more application performance requirements for the application associated with the application session;
determine that a metric associated with the streaming profile satisfies at least an application performance requirement of the one or more application performance requirements;
based at least on the metric satisfying the application performance requirement, send, using the first data center and to a second data center of the one or more second data centers, a second request to host the application session;
receive, using the first data center and from the second data center, an acceptance to host the application session; and
send, using the first data center and to the user device, an indication that the user device is routing network traffic corresponding to the application session to the second data center.

19. The system of claim 18, wherein the one or more network tests include at least one of a jitter test, a packet loss test, a bandwidth test, or a latency test.

20. The system of claim 18, wherein the application is a game application, the application session is a game instance of the game application, and the first data center and the one or more second data centers are associated with a cloud gaming environment.

* * * * *